(12) United States Patent
Löffler (10) Patent No.: US 12,439,839 B2
(45) Date of Patent: Oct. 14, 2025

(54) SLIDE BEARING JOINT BUSH FOR A HARVESTING DEVICE

(71) Applicant: CLAAS Saulgau GmbH, Bad Saulgau (DE)

(72) Inventor: Niklas Löffler, Hohentengen (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 997 days.

(21) Appl. No.: 17/465,993

(22) Filed: Sep. 3, 2021

(65) Prior Publication Data

US 2022/0071080 A1 Mar. 10, 2022

(30) Foreign Application Priority Data

Sep. 4, 2020 (DE) .......................... 102020123140.7
Jul. 13, 2021 (DE) .......................... 102021118106.2

(51) Int. Cl.
*A01B 71/04* (2006.01)
*A01B 71/08* (2006.01)

(52) U.S. Cl.
CPC .............. *A01B 71/08* (2013.01); *A01B 71/04* (2013.01)

(58) Field of Classification Search
CPC .... A01B 71/04; A01B 71/08; A01D 41/1252; A01D 41/1243; A01D 69/00; A01D 69/12; A01D 43/08; A01D 43/107; F16C 2310/00; F16C 13/02; A01F 29/00; A01F 29/005; A01F 29/01; A01F 29/09; A01F 29/095; A01F 2015/186
See application file for complete search history.

(56) References Cited

U.S. PATENT DOCUMENTS

| | | | | |
|---|---|---|---|---|
| 2,014,859 A | * | 9/1935 | Mitchell, Jr. | ........... F16C 33/80 277/420 |
| 2,827,344 A | * | 3/1958 | Maag | .................. F16C 33/6618 384/484 |
| 3,135,307 A | * | 6/1964 | Blanshine | ............. A01F 29/095 56/294 |
| 6,139,478 A | * | 10/2000 | Viaud | ..................... A01F 15/07 492/47 |
| 6,619,851 B2 | * | 9/2003 | Vogelgesang | ......... F16C 19/184 384/488 |

(Continued)

FOREIGN PATENT DOCUMENTS

| | | | | |
|---|---|---|---|---|
| DE | 3516131 A | * | 11/1986 | ............. A01B 71/04 |
| DE | 19754234 A1 | * | 6/1999 | ............. A01F 15/07 |

(Continued)

*Primary Examiner* — Adam J Behrens (57) ABSTRACT

Harvesting device of an agricultural harvesting machine, comprising a housing (17), comprising at least one rotatably driven apparatus (15) which has a shaft (18) and is rotatably mounted by the shaft (18) relative to the housing (17) about the longitudinal axis (19) thereof, comprising a sealing disk (21) which acts on the housing (17) and which is fixed relative to the shaft (18) for sealing the housing (17) relative to the shaft (18) in the region of a feed-through of the shaft (18) through the housing (17), wherein the sealing disk (21) has a through-passage (22) for the feed-through of the shaft (18), wherein when viewed in the radial direction of the shaft (18) a slide bearing joint bush (25) is arranged between the shaft (18) and the sealing disk (21).

13 Claims, 6 Drawing Sheets

(56) References Cited

U.S. PATENT DOCUMENTS

| | | | | |
|---|---|---|---|---|
| 7,311,448 | B2 * | 12/2007 | Engel | A01D 41/12 |
| | | | | 384/480 |
| 11,071,253 | B2 * | 7/2021 | Bohrer | A01D 69/12 |
| 2005/0238271 | A1 * | 10/2005 | Schafer | F16C 33/805 |
| | | | | 384/460 |
| 2006/0080836 | A1 * | 4/2006 | Hood | A01F 15/18 |
| | | | | 29/898.07 |
| 2010/0051451 | A1 * | 3/2010 | Sato | C25D 17/004 |
| | | | | 204/279 |
| 2019/0069485 | A1 * | 3/2019 | Bohrer | F16C 33/6662 |

FOREIGN PATENT DOCUMENTS

| | | | | |
|---|---|---|---|---|
| DE | 29522165 | U1 * | 3/2000 | A01B 71/08 |
| DE | 102018208791 | A1 * | 12/2019 | A01D 43/085 |
| WO | WO-2008030470 | A2 * | 3/2008 | B65G 39/09 |

* cited by examiner

SLIDE BEARING JOINT BUSH FOR A HARVESTING DEVICE

The invention relates to a harvesting device according to the preamble of claim 1.

A harvesting device of an agricultural harvesting machine which is configured as a conditioning device is disclosed in EP 2 532 222 A1. Such conditioning devices are used in agricultural harvesting technology, in particular on self-propelled forage harvesters in order to open up the grains contained in the picked-up harvested crops for improved digestibility when subsequently fed to animals. The disclosed conditioning device comprises a first roller and a second roller which in each case are rotatably mounted relative to a housing about the longitudinal axis thereof. The two rollers in this case define a gap, the harvested crops passing through said gap. The rollers are mounted in the housing by means of a shaft. A sealing disk with a through-passage configured therein is provided for sealing the housing in the region of the feed-through of a shaft through the housing. The respective shaft penetrates the through-passage of the sealing disk. A shaft seal is arranged between the sealing disk and the shaft. The shaft seal is arranged on the shaft by means of a slide bearing bush.

The shaft to which the sealing disk is assigned may be moved in a translatory manner. This may result in an oblique position relative to the housing. A clamping of the sealing disk may be caused by such an oblique position-hereinafter also denoted as tilt or tilting. The sealing disk or, respectively, the slide bearing bush and/or the shaft seal may be damaged as a result, whereby the housing is no longer sealed in the region of the feed-through of the respective shaft. Thus in the case of a conditioning device, the juice of the harvested crops may pass to the outside.

There is a need for a harvesting device in which the risk of damage to a sealing disk arranged in the region of a shaft feed-through is reduced.

Proceeding therefrom, it is the object of the present invention to provide a novel harvesting device.

This object is achieved by a harvesting device according to claim 1.

According to the invention, when viewed in the radial direction of the shaft, a slide bearing arrangement designed as a joint bush is arranged between the shaft and the sealing disk.

The slide bearing joint bush permits the shaft to be tilted relative to the sealing disk and compensates for this tilt or, respectively, counteracts this tilt. There is no risk that the sealing disk or, respectively, the slide bearing joint bush is clamped and, as a result, damaged. Thus it is possible to counteract or, respectively, compensate for oblique shaft positions and/or an offset of the housing without the risk of damage to the sealing disk which is arranged in the region of a shaft feed-through.

The slide bearing joint bush preferably acts on the sealing disk and is fixed relative to the shaft. In this case, the slide bearing joint bush is preferably secured against rotation or, respectively, twisting relative to the sealing disk by one or more securing pins.

According to an advantageous development, the slide bearing joint bush is preferably formed as a spherical bearing. This is also particularly preferred in order to counteract oblique shaft positions and/or an offset of the housing and to reduce the risk of damage to the sealing disk or, respectively, slide bearing elements and sealing elements.

According to an advantageous development, a shaft seal is arranged in the region of the slide bearing joint bush, said shaft seal being arranged adjacent to the slide bearing joint bush when viewed in the axial direction of the shaft, or being received by the slide bearing joint bush and thus being integrated therein. Thus when the seal is received by the slide bearing joint bush and thus integrated therein, a particularly advantageous seal may be ensured with a compact design.

According to an advantageous development, the slide bearing joint bush has at least one groove on a slide bearing surface which bears against the shaft. As a result, on the one hand, the friction between the slide bearing bush and shaft is reduced and, on the other hand, contaminants collecting between the shaft and the sealing disk may be removed via a groove which runs, in particular, in a helical or screw-shaped manner. Moreover, the groove may advantageously serve as a reservoir for lubricant which further reduces the friction. This reservoir may be supplied with lubricant (oil and/or grease) via a lubricating nipple manually from the outside or via a central lubrication system.

According to an advantageous development, the sealing disk is configured in multiple parts. This permits an exchange of a potentially damaged part of the sealing disk. At the same time, the part of the sealing disk which is subjected to wear and which is located in the housing interior may be exchanged as a wear part.

Preferably, the harvesting device is a conditioning device comprising a first roller and a second roller which are rotatably mounted via the shafts thereof on the housing and which define a gap for passing through harvested crops, wherein the sealing disk and the slide bearing joint bush are assigned to at least one of the shafts. The invention is used, in particular, in conditioning devices, thus for example in corn crackers provided in forage harvesters.

The invention may also be installed in other subassemblies of a forage harvester and also other harvesting devices, such as for example hammer mills, grist mills, grain mills and other machines in which a shaft feed-through has to be sealed.

Preferred developments of the invention are disclosed in the dependent claims and the following description. Exemplary embodiments of the invention are described in more detail with reference to the drawing, without being limited thereto. In the drawing:

The invention relates to a harvesting device of an agricultural harvesting machine.

The invention is described hereinafter for the preferred application in which the harvesting device is a conditioning device of a self-propelled forage harvester. Such a conditioning device is also denoted as a corn cracker.

Figure 1:
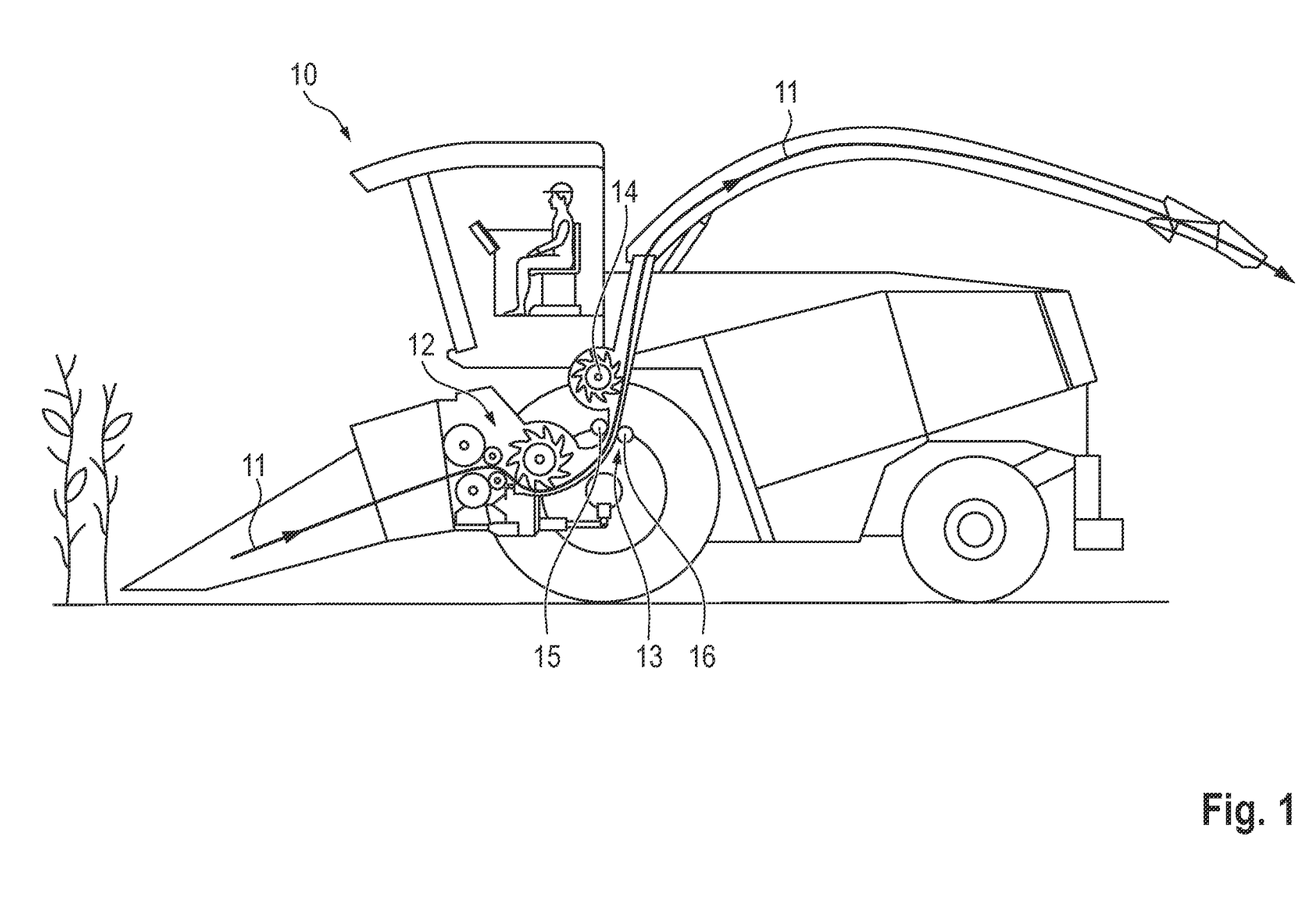
FIG. 1 shows a side view of a harvesting machine configured as a forage harvester with a harvesting device configured as a conditioning device.

FIG. 1 shows in a schematic side view a self-propelled forage harvester 10 when harvesting on a field. The forage harvester 10 harvests plants from the field in order to pass the obtained harvested crops 11, in the form of a harvested crop flow, through processing members and conveying members of the forage harvester 10. In this case the processing and conveying members of the forage harvester 10 comprise a chopping assembly 12, a conditioning device 13 mounted downstream of the chopping assembly 12 and a discharge accelerator 14 mounted downstream of the conditioning device 13.

The conditioning device 13 substantially comprises a roller pair consisting of a first roller 15 and a second roller 16. The two rollers 15, 16 are arranged parallel to one another and are spaced apart such that said rollers define a gap through which harvested crops are conveyed during operation. The principal construction of such a conditioning device 13 is disclosed in EP 2 532 222 A1.

Figure 2:
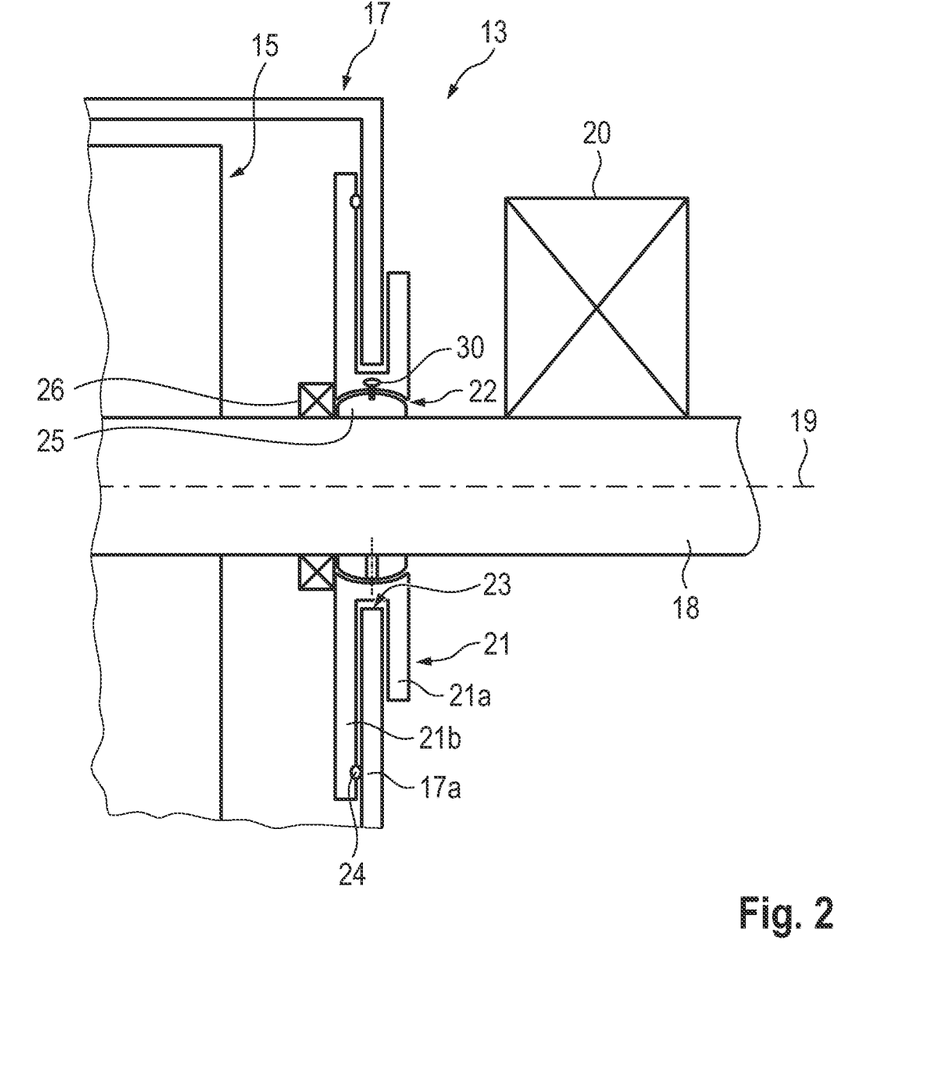
FIG. 2 shows a detail of a harvesting device according to the invention configured as a conditioning device.

FIG. 2 shows a schematic detail of a conditioning device 13 in the region of a rotating apparatus, namely one of the rollers 15 of the conditioning device 13. The conditioning device 13 has a housing 17 which is preferably configured in multiple parts from a first housing portion and a second housing portion. The roller 15 shown in FIG. 2 has a shaft 18 and is rotatably mounted relative to the housing 17 via the shaft 18 about the rotational axis 19 thereof. FIG. 2 shows a bearing 20 positioned outside the housing 17 for bearing the shaft 18 of the roller 15.

A sealing disk 21 which is fixed relative to the shaft 18 acts on the housing 17 of the conditioning device 13. The sealing disk 21 serves for sealing the housing 17 relative to the shaft 18 in the region of a feed-through of the shaft 18 through the housing 17, wherein the sealing disk 21 has or, respectively, defines a through-passage 22 for the shaft 18.

In the exemplary embodiment of FIG. 2 the sealing disk 21 has a U-shaped contour in cross section with two arms 21a, 21b extending in the radial direction, a groove 23 into which the housing 17 protrudes with a wall 17a being configured therebetween. A seal is configured 24 between this wall 17a and the arms 21b of the sealing disk 21 positioned in the interior of the housing 17.

According to the invention, in the harvesting device configured as a conditioning device 13 in FIG. 2, when viewed in the radial direction of the shaft 18, a slide bearing joint bush 25 is arranged between the shaft 18 and the sealing disk 21.

The slide bearing joint bush 25 may permit a tilting or, respectively, oblique positions of the shaft 18 relative to the sealing disk 21 and compensates for this tilting or, respectively, counteracts the tilting. It is possible to counteract oblique positions of the shaft 18 and/or an offset of the housing 17.

In the exemplary embodiment shown, the slide bearing joint bush 25 acts in a fixed manner on the sealing disk 21 and is accordingly configured together with the sealing disk 21 so as to be fixed relative to the shaft 18. At least one securing pin 30 fixes the separate slide bearing joint bush 25 fixedly in terms of rotation to the sealing disk 21 so that the slide bearing joint bush 25 is secured against twisting or rotation in the circumferential direction.

The slide bearing joint bush 25 is preferably configured as a spherical bearing. A tilting of the shaft 18 is possible and is counteracted or, respectively, compensated so that there is no risk of a clamping of the sealing disk 21 and damage to the sealing disk 21 or, respectively, the slide bearing joint bush 25 or, respectively, the sealing element 26 as a result of clamping.

A radial shaft seal 26 is arranged in the region of the slide bearing joint bush 25. In FIG. 2, when viewed in the axial direction of the shaft 18, this radial shaft seal 26 is arranged adjacent to the slide bearing joint bush 25, and namely adjacent to the arm 21b of the sealing disk 21 positioned in the interior of the housing 17.

Figure 3:
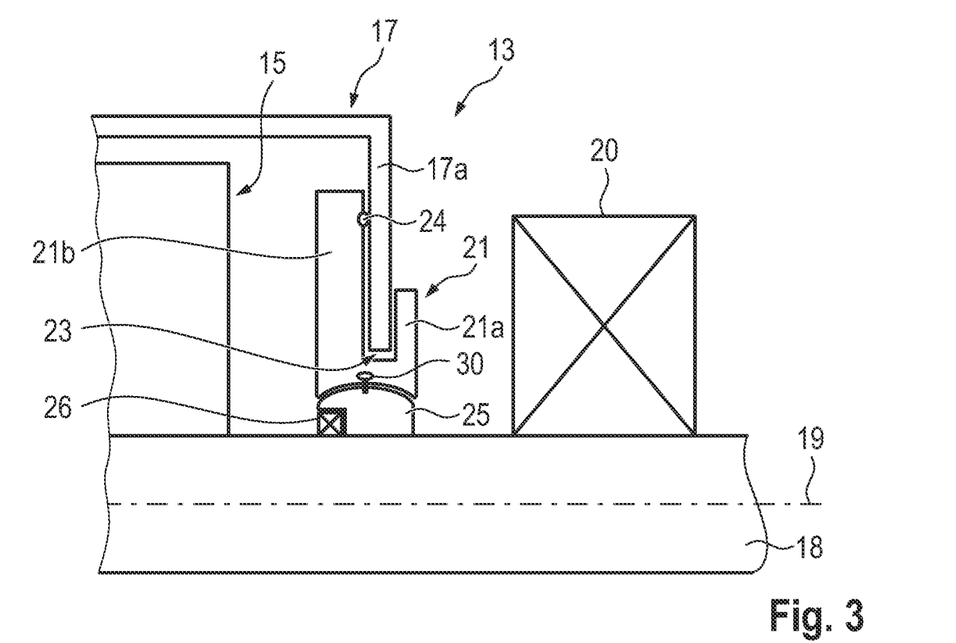
FIG. 3 shows an alternative detail of a harvesting device according to the invention configured as a conditioning device.

In FIG. 3 the radial shaft seal 26 is received by the slide bearing joint bush 25 and thus is integrated in the slide bearing joint bush 25, and namely in FIG. 3 at an axial position at which the arm 21b of the sealing disk 21 positioned in the interior of the housing 17 is arranged.

If as shown in FIG. 3 the radial shaft seal 26 is arranged in the plane of the slide bearing joint bush 25, it is not subjected to load by forces and moments which may result from an oblique position and/or an offset of the shaft 18 and/or housing 17.

In the exemplary embodiments of FIGS. 2 and 3 the sealing disk 21 is designed in one piece with the two arms 21a and 21b.

Figure 4:
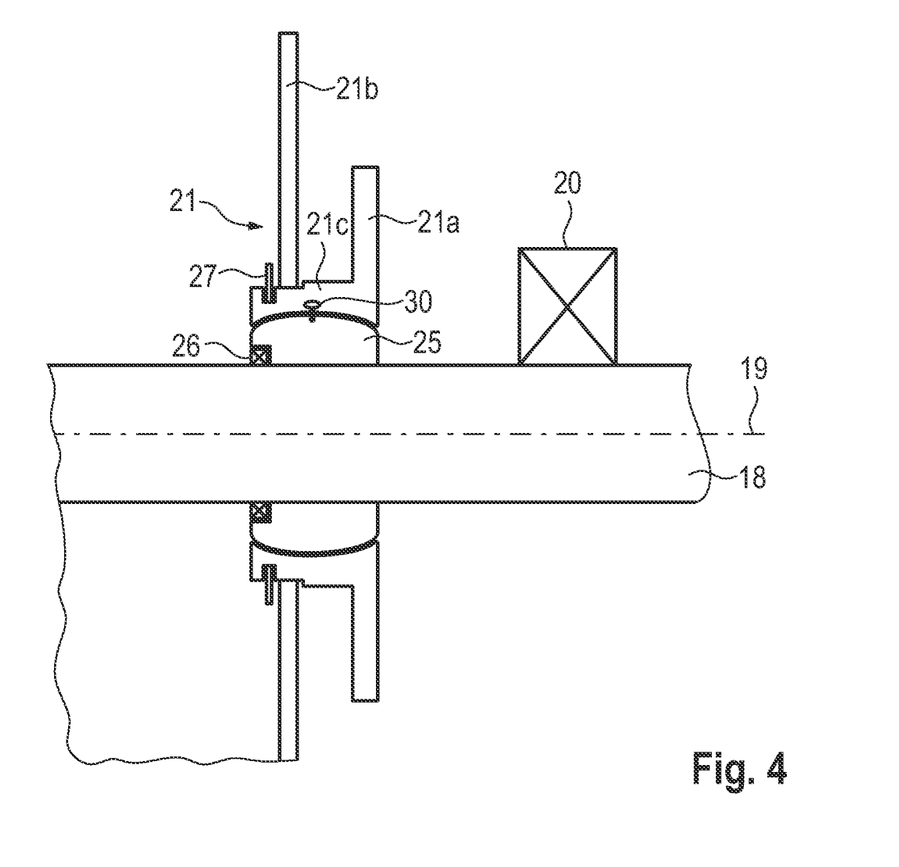
FIG. 4 shows a further alternative detail of a harvesting device according to the invention configured as a conditioning device.

However, a sealing disk 21 in which the two arms 21a, and 21b are formed from separate parts is shown in FIG. 4, wherein in FIG. 4 the sealing disk 21 is designed in two parts. The arm 21b positioned in the interior of the housing 17, not shown in FIG. 4, in this case is fixed via a securing disk 27 to a base body providing the arm 21a, namely to a transverse web 21c of the base body running between the arms 21a and 21b. In the variant of FIG. 4 the arm 21b of the sealing disk 21 may be exchanged.

In a further advantageous embodiment according to FIG. 4 a sliding seat may be provided for the exchangeable arm 21b on the base body in the axial direction. A spring element which is arranged between the securing disk 27 and the arm 21b pushes the arm 21b against the wall 17a. Due to the mobility permitted thereby, the arm 21b is advantageously adapted to different wall thicknesses or in the case of an offset or, respectively, oblique position advantageously to the wall 17a.

Thus if the sealing disk 21 is designed in multiple parts, as shown in FIG. 4, the individual parts may be formed from different materials. Thus in this case the base body comprising the transverse web 21c and the arm 21a positioned outside the housing 17 may be produced from aluminum, whilst the arm 21b positioned in the interior of the housing 17, not shown in FIG. 4, is formed from a different metal material. The heat dissipation may be improved and the weight reduced via such a base body made of aluminum.

Figure 5:
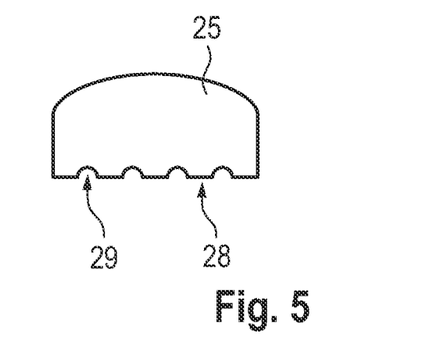
FIG. 5 shows a detail of a slide bearing joint bush of the harvesting device.
Figure 6:
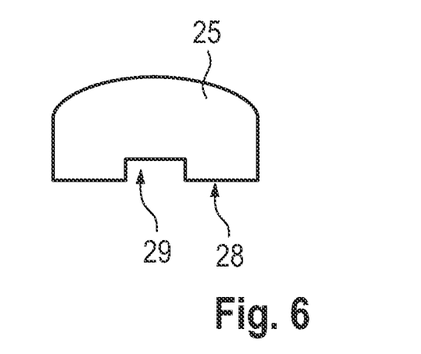
FIG. 6 shows an alternative detail of a slide bearing joint bush of the harvesting device.
Figure 7:
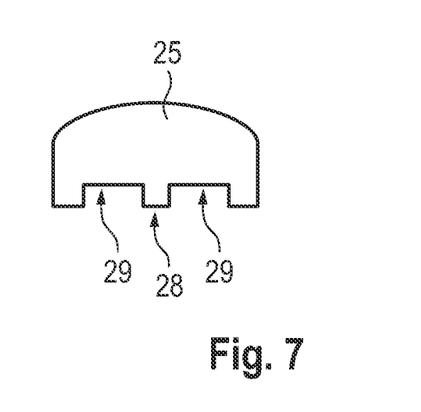
FIG. 7 shows a further alternative detail of a slide bearing joint bush of the harvesting device.

FIGS. 5, 6 and 7 show different embodiments of slide bearing joint bushes 25 which have at least one groove 29 in the region of a slide bearing surface 28 of the slide bearing joint bush 25, the slide bearing joint bush coming to bear against the shaft 18 with said slide bearing surface. In FIG. 6 a single groove 29 which circulates in the circumferential direction is present. In FIG. 7 two grooves 29 which circulate in the circumferential direction and which are spaced apart from one another in the axial direction are present. FIG. 5 shows a helical or screw-shaped groove 29, soiling or contaminants being able to be removed thereby.

The slide bearing joint bush 25 may be produced from a metal material, such as copper or brass, or even from plastics.

Figure 8:
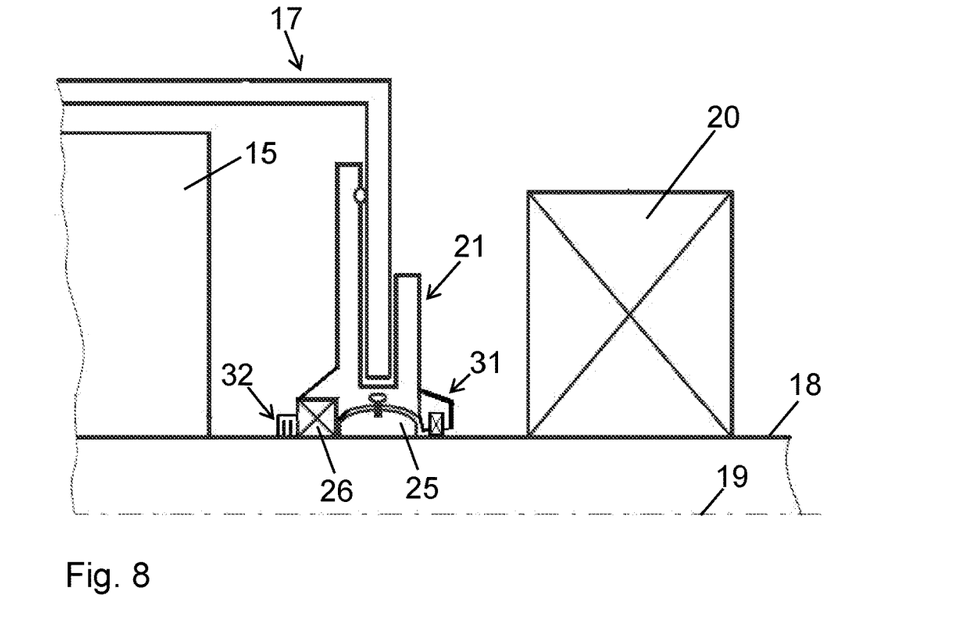
FIG. 8 shows a further alternative detail of a harvesting device according to the invention configured as a conditioning device.

According to a further embodiment according to FIG. 8, a sealing element 31, for example in the form of a felt ring or the like, is arranged upstream of the slide bearing joint bush 25 on the outer face. Thus the slide bearing joint bush 25 may be protected particularly advantageously from the ingress of dirt from the surroundings. Moreover, a sealing element 32, for example in the form of a labyrinth seal, or a further shaft seal is also arranged on the inner face upstream of the slide bearing joint bush 25 or, respectively, the radial shaft seal 26. Thus the sealing lip of the radial shaft seal 26 may be particularly advantageously protected from heavy soiling and/or damage by harvested crops, foreign bodies or, respectively, harvested crop deposits.

According to this embodiment, a sealing element 31, 32 may be arranged both on the inside and on the outside upstream of the slide bearing joint bush 25. Equally, however, it is also possible to provide a sealing element only on the outside or only on the inside.

Any elements which keep away contaminants or the like from the slide bearing joint bush 25 or, respectively, from any seals 26 arranged upstream may be provided as sealing elements.

Figure 9:
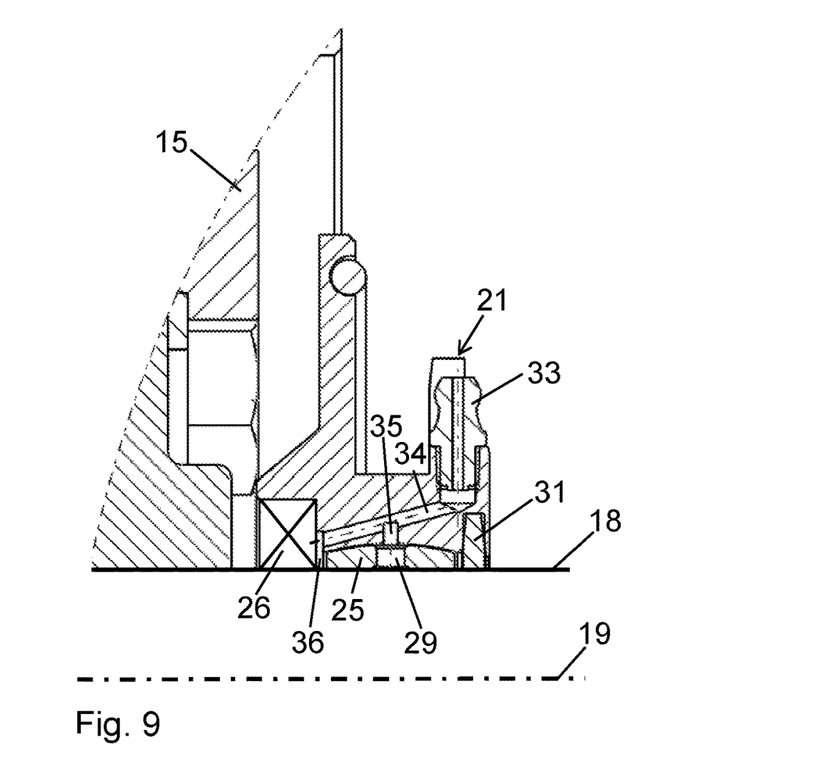
FIG. 9 shows a further alternative detail of a harvesting device according to the invention configured as a conditioning device.

In FIG. 9 a further embodiment is shown in which a lubricating nipple 33 is provided on the sealing disk 21. The lubricating nipple 33 cooperates with a lubricant channel 34 which runs toward the radial shaft seal 26 and preferably terminates at a circular groove 36 on the radial shaft seal 26. Lubricant may be supplied by the lubricating nipple 33, said lubricant passing via the lubricant channel 34 to the circular groove 36 and being distributed there to the radial shaft seal 26 on the circumference of the shaft 18.

The lubricant channel 34 is preferably also connected via a circumferential groove 35 to the slide bearing joint bush 25. The circumferential groove 35 cooperates with bores 29 which are arranged so as to be distributed over the circumference on the slide bearing joint bush 25 and which run in the radial direction from the outer circumference toward the shaft 18. The lubricant flows via the groove 35 to the bores 29, via which the lubricant passes to the shaft 18 and may be distributed on the contact surface between the shaft 18 and the slide bearing joint bush 25.

In addition to the lubrication of the slide bearing joint bush 25 and the radial shaft seal 26 for reducing the frictional force, the supply of lubricant may also be advantageously used for transporting away dirt. To this end, preferably more lubricant is supplied through the lubricating nipple 33 than the lubricant channel 34, the groove 35 and the other cavities are able to receive. The supplied lubricant pushes the lubricant, which is already located in the cavities and loaded with dirt particles or any other dirt which has been introduced, outwardly through the gap between the slide bearing joint bush 25 and the shaft 18 and through the radial shaft seal 26 out of the bearing region. As a result, dirt particles or the like are advantageously removed from the bearing surfaces or, respectively, contact surfaces and fresh lubricant is supplied thereto.

The harvesting device according to the invention is, in particular, a conditioning device 13 such as a corn cracker. Such a conditioning device 13 has a plurality of rotating apparatuses, namely a first roller and a second roller, which are rotatably mounted via the shafts 18 thereof in the housing 17 and define a gap for passing through harvested crops. In this case at least one of the shafts has the sealing disk 21 and the slide bearing joint bush 25, as described above, on at least one feed-through through a wall. Whilst the invention is used particularly advantageously in conditioning devices 13, the invention may also be used in other harvesting devices of a forage harvester, thus for example in the region of the discharge accelerator 14 or the chopping assembly 12.

Moreover, the invention may be installed in other harvesting devices, such as for example hammer mills, grist mills, grain mills and other machines in which a shaft feed-through has to be sealed.

LIST OF REFERENCE NUMERALS

10 Forage harvester
11 Harvested crops
12 Chopping assembly
13 Conditioning device
14 Discharge accelerator
15 Apparatus/roller
16 Apparatus/roller
17 Housing
17a Wall
18 Shaft
19 Rotational axis
20 Bearing
21 Sealing disk
21a Arm
21b Arm
21c Transverse web
22 Through-passage
23 Groove
24 Seal
25 Slide bearing joint bush
26 Radial shaft seal
27 Securing disk
28 Slide bearing surface
29 Groove
30 Securing pin
31 Sealing element
32 Sealing element
33 Lubricating nipple
34 Lubricant channel
35 Groove
36 Groove

The invention claimed is:

1. A harvesting device of an agricultural harvesting machine comprising:
    a housing (17),
    at least one rotatably driven apparatus (15) which has a shaft (18) and is rotatably mounted by the shaft (18) relative to the housing (17) about the longitudinal axis (19) thereof,
    a sealing disk (21) which acts on the housing (17) and which is fixed relative to the shaft (18) for sealing the housing (17) relative to the shaft (18) in the region of a feed-through of the shaft (18) through the housing (17), wherein the sealing disk (21) has a through-passage (22) for the feed-through of the shaft (18), wherein
    when viewed in the radial direction of the shaft (18), a slide bearing bush is arranged between the shaft (18) and the sealing disk (21),
    characterized in that the slide bearing bush is designed in the form of a slide bearing joint bush (25) and forms a spherical bearing.
2. The harvesting device according to claim 1, characterized in that the slide bearing joint bush (25) is secured against twisting or, respectively, rotation by at least one securing pin (30).

3. The harvesting device according to claim 1, characterized in that a sealing element (31) is arranged upstream of the slide bearing joint bush (25) on the outer face.

4. The harvesting device according to claim 1, characterized in that a radial shaft seal (26) is arranged in the region of the slide bearing joint bush (25).

5. The harvesting device according to claim 4, characterized in that, when viewed in the axial direction of the shaft (18), the radial shaft seal (26) is arranged adjacent to the slide bearing joint bush (25).

6. The harvesting device according to claim 4, characterized in that the radial shaft seal (26) is received by the slide bearing joint bush (25) and thus is integrated therein.

7. The harvesting device according to claim 4, characterized in that a sealing element (32) is arranged upstream of the slide bearing joint bush (25) on the inner face, the sealing element protecting the radial shaft seal (26) from soiling.

8. The harvesting device according to claim 1, characterized in that the slide bearing joint bush (25) has at least one groove (29) on a slide bearing surface (28) which bears against the shaft.

9. The harvesting device according to claim 8, characterized in that the at least one groove (29) is provided as a reservoir for lubricant.

10. The harvesting device according to claim 1, characterized in that the slide bearing joint bush (25) acts on the sealing disk (21) and is fixed relative to the shaft (18).

11. The harvesting device according to claim 1, characterized in that the sealing disk (21) is configured in multiple parts.

12. The harvesting device according to claim 1, characterized in that the harvesting device is a conditioning device comprising a first roller (15) and a second roller (16) which are rotatably mounted via the shafts (18) thereof on the housing (17) and which define a gap for passing through harvested crops, wherein the sealing disk (21) and the slide bearing joint bush (25) are assigned to at least one of the shafts (18) on at least one feed-through of the shaft (18) through the housing (17).

13. The harvesting device according to claim 1, characterized in that the harvesting device is designed as a hammer mill, grist mill or grain mill.

\* \* \* \* \*